(12) United States Patent
Choi et al.

(10) Patent No.: US 7,555,761 B2
(45) Date of Patent: Jun. 30, 2009

(54) OPTICAL PICK-UP ACTUATOR

(75) Inventors: In Ho Choi, Sungnam-si (KR); Sam Nyol Hong, Suwon-si (KR); Jin A Kim, Seoul (KR); Young Joong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 315 days.

(21) Appl. No.: 11/315,243

(22) Filed: Dec. 23, 2005

(65) Prior Publication Data

US 2006/0143640 A1    Jun. 29, 2006

(30) Foreign Application Priority Data

Dec. 27, 2004    (KR) ...................... 10-2004-0113190

(51) Int. Cl.
  *G11B 7/08* (2006.01)
(52) U.S. Cl. ..................................... 720/683
(58) Field of Classification Search ................... 720/683
  See application file for complete search history.

(56) References Cited

U.S. PATENT DOCUMENTS

| | | | |
|---|---|---|---|
| 6,344,936 B1 * | 2/2002 | Santo et al. ................. | 359/824 |
| 6,741,543 B1 * | 5/2004 | Suzuki et al. ................ | 720/683 |
| 7,210,154 B2 * | 4/2007 | Song et al. ................... | 720/681 |
| 2005/0034143 A1 * | 2/2005 | Hashimoto ................... | 720/683 |
| 2005/0166217 A1 * | 7/2005 | Van Rooij et al. ............ | 720/672 |
| 2005/0185530 A1 * | 8/2005 | Akanuma ................. | 369/44.15 |
| 2005/0185533 A1 * | 8/2005 | Tanaka ..................... | 369/44.22 |

\* cited by examiner

*Primary Examiner*—Mark Blouin
(74) *Attorney, Agent, or Firm*—Birch, Stewart, Kolasch & Birch, LLP

(57) ABSTRACT

An optical pick-up actuator is provided. The optical pick-up actuator includes a lens holder, a tracking coil, a focusing coil, and a magnet. The lens holder holds an objective lens. The tracking coil is wound with wire, is disposed at a central portion on both sides of the lens holder, and includes a horizontal width at a top thereof that is less than a horizontal width at a bottom thereof. The focusing coil is wound with wire, is disposed at a left and a right on both sides of the lens holder, and includes a horizontal width at a top thereof that is greater than a horizontal width at a bottom thereof. The magnet faces the tracking coil and the focusing coil.

20 Claims, 11 Drawing Sheets

5

OPTICAL PICK-UP ACTUATOR

BACKGROUND OF THE INVENTION

1. Field of the Invention

The present invention relates to an optical pick-up actuator, and more particularly, to an optical pick-up actuator capable of recording data on an optical recording medium or reproducing data recorded on an optical recording medium.

2. Description of the Related Art

An optical pick-up actuator moves a lens holder with an objective lens, and maintains the position of the objective lens at a fixed position with respect to an optical recording medium. The optical pick-up actuator follows the track of an optical recording medium to record data and reproduce data recorded on the optical recording medium.

FIG. 1 is a perspective view of an optical pick-up actuator according to the related art, and FIG. 2 is a magnetic circuit of an optical pick-up actuator according to the related art.

Referring to FIGS. 1 and 2, the optical pick-up actuator includes an objective lens 201 formed in a lens holder 202 in a central portion thereof, and a magnetic circuit formed at the side thereof for driving the lens holder 202. The magnetic circuit includes a focusing coil 205 and tracking coil 206, a tilt coil 217, a yoke 203, and multi-pole-magnetized magnets 204a, 204b, 204c, and 204d.

As shown in FIGS. 1 and 2, on both the left and right sides of the lens holder 202 are focusing coils 205 (for performing focusing) attached in mutual opposition with respect to a vertical boundary between polarizations of the magnets (204a and 204c) and (204b and 204d), and in the central portions of the left and right sides of the lens holder 202 are tracking coils 206 (for performing tracking) attached in mutual opposition with respect to a horizontal boundary between polarizations of the magnets 204a and 204b.

Also, a tilt coil 217 is formed on the peripheral surface of the lens holder 202 opposite to the horizontal boundary 204 of the magnets. The tilt coil 217 functions as a radial tilt coil.

A magnet 204 may be a single magnet with multiple poles or may consist of four unidirectional magnets.

Magnets 204 having multiple poles are respectively fastened on an inner surface of a yoke 203 of a ferromagnetic material to the left and right of the lens holder 202, and the yoke 203 is integrally formed through a joining means with a pick-up base (not shown).

One end of a wire suspension 207 is fixed to upper and lower portions on the central side surface of the lens holder 202, and the other end of the wire suspension 207 is fixed to a main substrate through a frame 209 provided at one end of the lens holder 202. The wire suspension 207 levitates the lens holder 202, and also functions as an intermediary wire that supplies a current.

Here, a damper (not shown) is formed inside the frame 209 for endowing the rigid wire suspension 207 with damping characteristics, and the other end of the wire suspension 207 is fixed to the main substrate (not shown) that is attached outside through soldering.

Referring to FIG. 3, an explanation of the operation of an optical pick-up actuator will be given.

When current flows in the focusing coil 205, the focusing coil 205 and the magnet 204 having multiple poles mutually act to exert a force in a vertical direction on the focusing coil 205. Accordingly, the lens holder 202 moves in a focusing direction (vertically).

When current flows in the tracking coil 206, the tracking coil 206 and the magnet 204 having multiple poles mutually act to exert a force in a horizontal direction on the tracking coil 206. Accordingly, the lens holder 202 moves in a tracking direction (horizontally).

As shown in FIG. 2, when current flows in the tilt coil 217 wound around the perimeter of the lens holder 202, the tilt coil 217 and the multi-pole magnets 204a and 204b mutually act to exert forces in opposite directions with respect to the left and right sides of the tilt coil 217.

If the lens holder 202 moving in conjunction with the mounted coils 205 and 206 is called a moving coil method, a converse movement of the lens holder 202 with a magnet mounted thereto is called a moving magnet method.

Such an optical pick-up actuator operates as a moving coil by means of a magnetic field of permanent magnets, to move the objective lens to a predetermined desired location on an optical recording medium. That is, the lens holder 202 is fixed by the wire suspension 207, and must be moved in focusing and tracking directions without errors occurring.

However, as shown in FIG. 3, when moving in a tracking direction of the lens holder, the weight center (WC) and the force center (TC) do not match, so that the device operates in a rolling mode in high-threshold frequencies.

That is, the weight center in a vertical direction is the center of the lens holder 202, whereas the force (F) in a tracking direction has a center located at the center of the tracking coil 206, so that there is a distance d between the weight center and the force center. When the lens holder 202 moves in a tracking direction, there is the problem of torque (Fd) created at the force center of the tracking coil 206.

SUMMARY OF THE INVENTION

Accordingly, the present invention is directed to an optical pick-up actuator that substantially obviates one or more problems due to limitations and disadvantages of the related art.

An object of the present invention is to provide an optical pick-up actuator that changes the structure of a tracking coil to allow a secure operation of the lens holder.

Another object of the present invention is to provide an optical pick-up actuator that changes the structure of a focusing coil according to the structure of a tracking coil to securely operate a focusing servo.

A further object of the present invention is to provide an optical pick-up actuator that alters the wire winding location of a tilt coil and the structure of the tilt coil, to simplify the manufacturing process thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an optical pick-up actuator including: a lens holder holding an objective lens; a tracking coil wound with wire disposed at a central portion on both sides of the lens holder and including a horizontal width at a top thereof that is less than a horizontal width at a bottom thereof; a focusing coil wound with wire disposed at a left and a right on both sides of the lens holder and including a horizontal width at a top thereof that is greater than a horizontal width at a bottom thereof; and a magnet facing the tracking coil and the focusing coil.

In another aspect of the present invention, there is provided an optical pick-up actuator including: a lens holder holding an objective lens; a tracking coil wound with wire disposed at a central portion on both sides of the lens holder and including a horizontal width at a top thereof that is less than a horizontal width at a bottom thereof; a focusing coil wound with wire disposed at a left and a right on both sides of the lens holder and including a horizontal width at a top thereof that is greater than a horizontal width at a bottom thereof; a tilt coil wound with wire together with the focusing coil; and a magnet facing the tracking coil, the focusing coil, and the tilt coil.

In a further aspect of the present invention, there is provided an optical pick-up actuator having a magnetic circuit for moving a lens holder holding an objective lens on multiple axes, wherein the magnetic circuit includes: a trapezoidal tracking coil wound with wire at a central portion on both sides of the lens holder, an inverse trapezoidal focusing coil wound with wire to a left and a right of the tracking coil, and a multi-polar magnet having a bi-polarity opposite to the focusing coil and the tracking coil.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
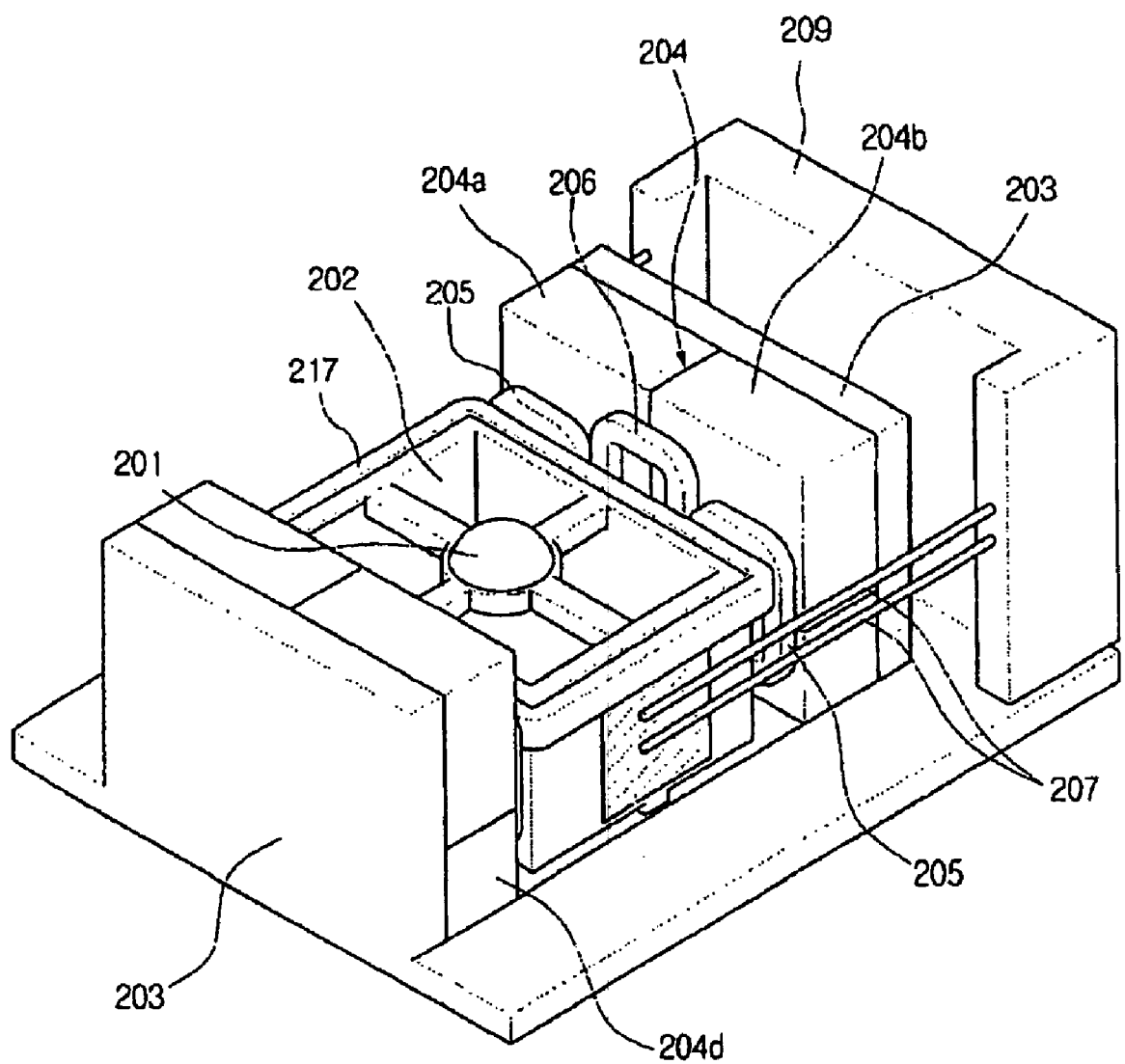
FIG. 1 is a perspective view of an optical pick-up actuator according to the related art.
Figure 2:
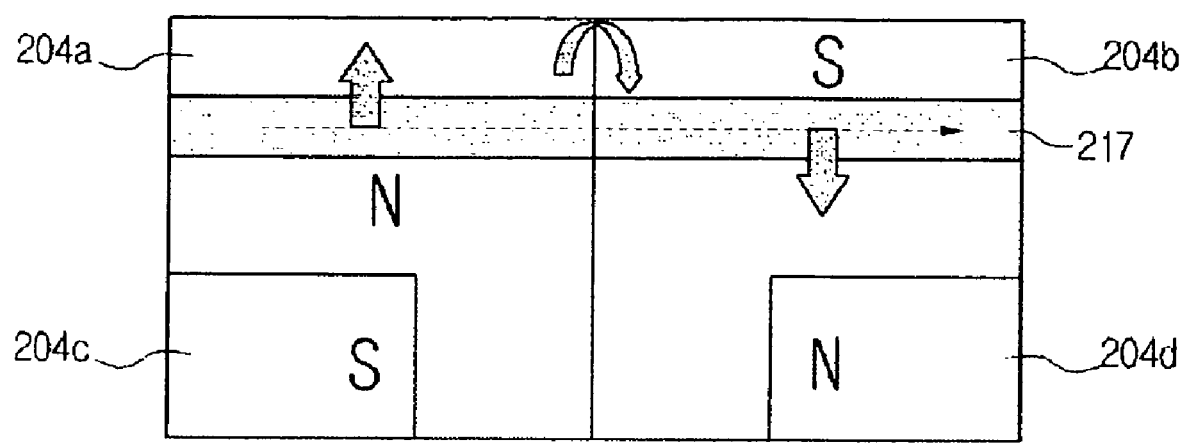
FIG. 2 is a magnetic circuit of an optical pick-up actuator according to the related art.
Figure 3:
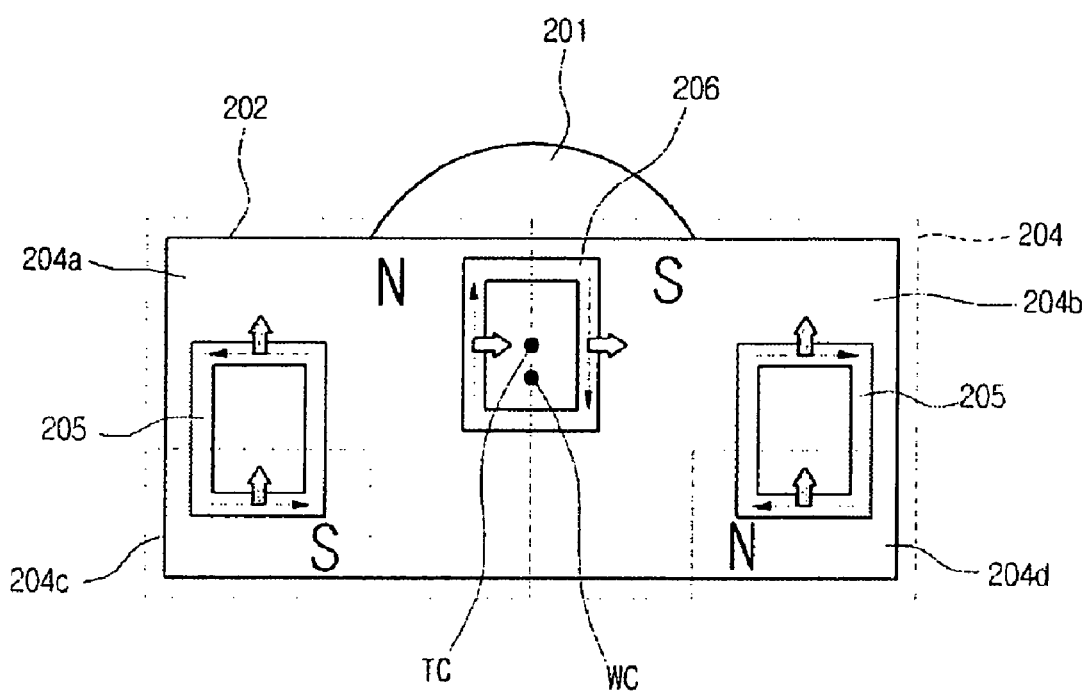
FIG. 3 is a plan view showing the weight center and tracking center of an optical pick-up actuator according to the related art.
Figure 4:
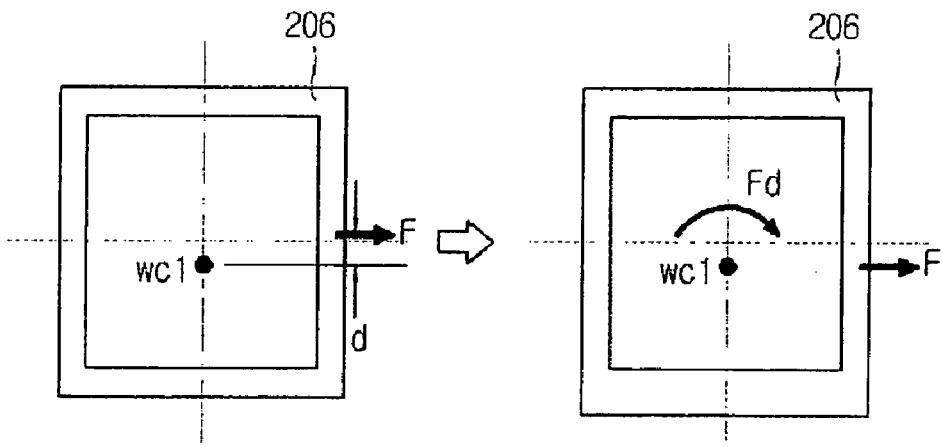
FIG. 4 is a plan view showing the occurrence of a rolling mode in a tracking coil according to the related art.
Figure 5:
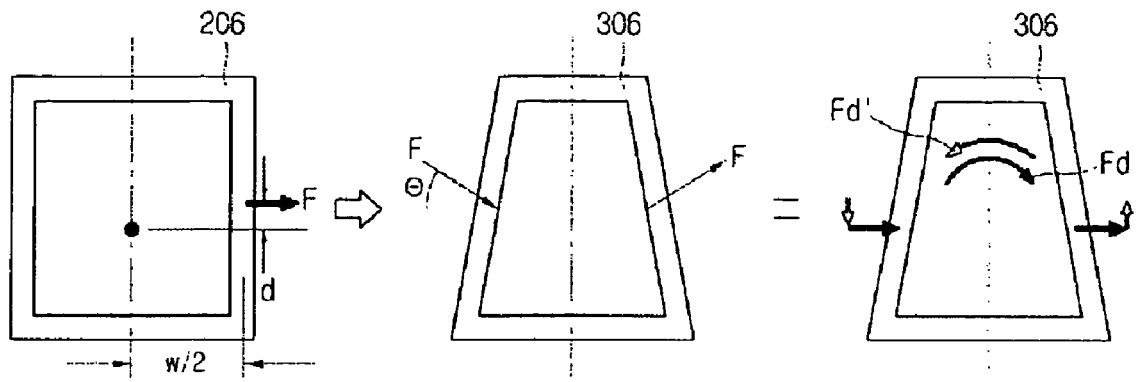
FIG. 5 is a plan view showing trapezoidal tracking coil for reducing the rolling mode of a tracking coil in an optical pick-up actuator according to the present invention.

Referring to FIG. 5, in order to neutralize torque that results from a dislocated force center of the tracking coil 206 and a dislocated weight center of the lens holder, a trapezoidal tracking coil 306 may be employed. That is, a trapezoidal shape is given to the tracking coil 306 to generate force in a vertical direction in addition to the force in a tracking direction, so that a torque Fd' in a negative direction is generated to neutralize the torque.

Specifically, torque (d×F×cos θ) that is generated from dislocation of a force center and weight center and torque (W/2×F×sin θ=d×F cos θ) of a negative direction that is generated from a trapezoid denote the same value. Accordingly, an incline angle θ is given to the tracking coil 306 to form a trapezoidal shape.

Figure 6:
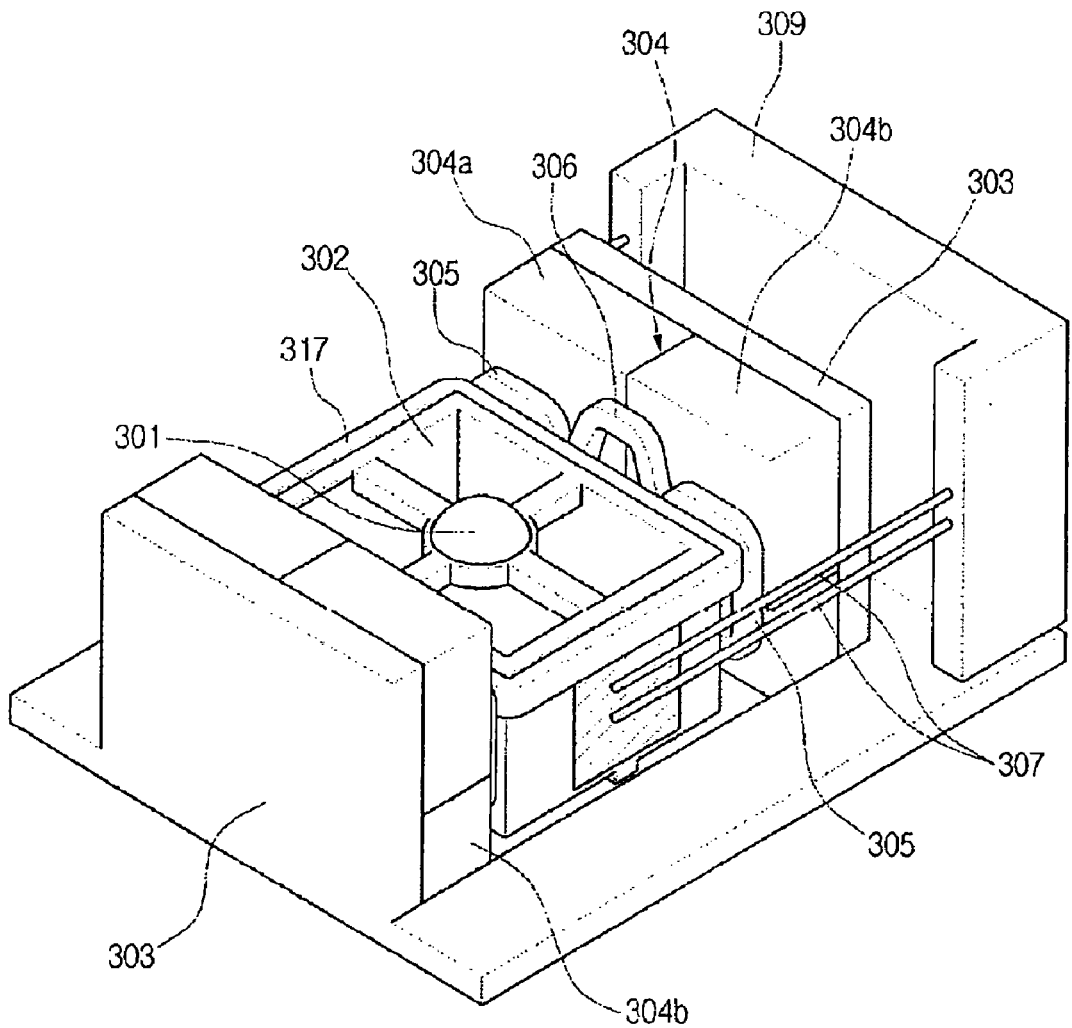
FIG. 6 is a perspective view of an optical pick-up actuator having a trapezoidal tracking coil according to the present invention.

An optical pick-up actuator with this trapezoidal tracking coil 306 formed thereon is shown in FIG. 6.

Referring to FIG. 6, a trapezoidal tracking coil 306 that is wound with wire is respectively disposed on the central portions of both sides of the lens holder 302, with a focusing coil 305 on both sides of the tracking coil 306, and a tilting coil 317 wound with wire around the perimeter of the lens holder 302. Here, the tilt coil 317 performs a radial tilt function.

In order to give the tracking coil 306 an incline angle, the upper width of the tracking coil 306 can be reduced, or the lower width can be increased. When the upper width is reduced, the tracking coil 306 may be of a size that is inadequate for generating a required force. When considering a neutral-zone that can only be increased due to the manufacturing characteristics of a 4-pole magnet shown in FIGS. 7(a) and 7(b), a tracking coil 306 of a predetermined size must be used.

Figure 7:
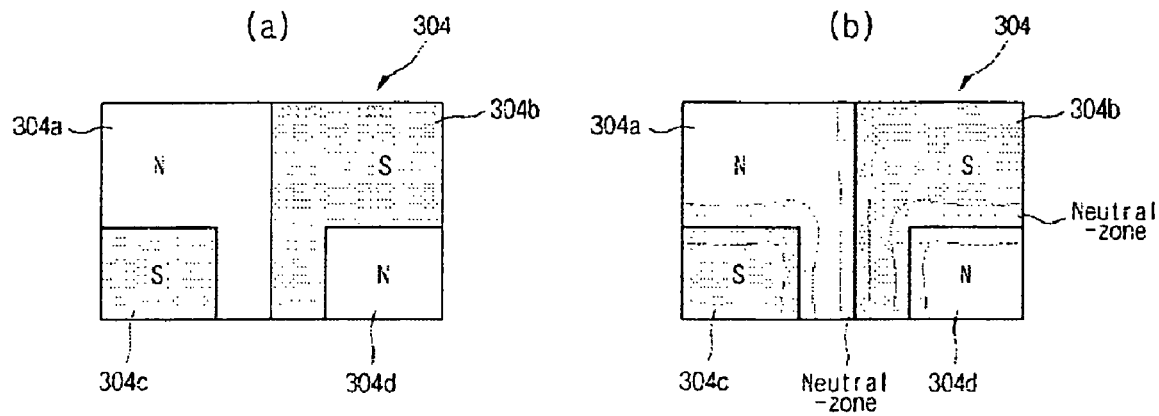
FIGS. 7(a) and 7(b) are plan views showing magnets used in FIG. 6.

Here, FIG. 7(a) shows an ideal magnetic pattern, and FIG. 7(b) shows an actual magnetic pattern of FIG. 6 with the occurrence of neutral zones.

To solve the above problem, the lower width of a trapezoidal tracking coil 306 is increased to increase the overall size of the tracking coil 306.

However, in order to increase the size of the tracking coil 306, the size of the focusing coil 305 must be reduced, or the position of the focusing coil 305 must be moved further outward within the limited space available, so that problems arise with operation in a focusing direction.

The following is a detailed description of the present invention with reference to preferred embodiments thereof.

FIRST EMBODIMENT

Figure 8:
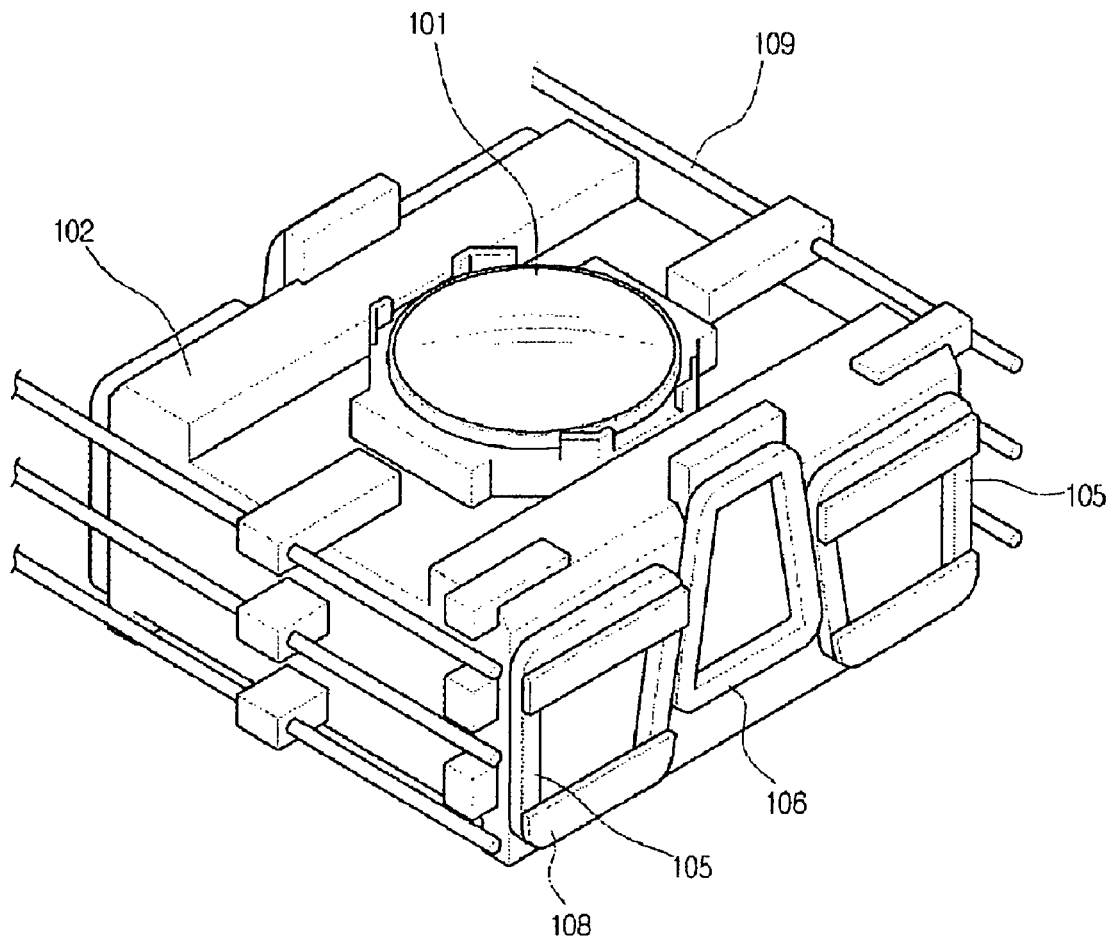
FIG. 8 is a perspective view of an optical pick-up actuator according to the first embodiment of the present invention.

FIG. 8 is a perspective view of an optical pick-up actuator according to the first embodiment of the present invention.

Referring to FIG. 8, an optical pick-up actuator according to the first embodiment of the present invention includes a lens holder 102 with an objective lens 101 formed thereon, an inverse trapezoidal focusing coil 105 wound with wire disposed on the left and right on both sides of the lens holder 102, and a tracking coil 106 disposed in central portions on both sides of the lens holder. Each of the coils 105, 106, and 107 is disposed opposite to a multi-polarized magnet.

Here, the focusing coil 105 is wire-wrapped around a coil support 108 in an asymmetrical inverse trapezoid, and the tracking coil 106 is wire-wrapped in a symmetrical trapezoidal shape.

Specifically, the horizontal width of the focusing coil 105 at the top is greater than at the bottom. The horizontal width of the tracking coil 106 at the top is less than at the bottom.

A description of the optical pick-up actuator according to the first embodiment of the present invention will now be given with reference to the diagrams.

Referring to FIG. 8, the central portions on both sides of the lens holder 102 have a mounted trapezoidal tracking coil 106 thereon, and to the left and right of the tracking coils 106 mounted on both sides of the lens holder 102 are inverse trapezoidal focusing coils 105.

Here, a trapezoidal shape denotes that the horizontal width at the top of a coil is less than that at the bottom of the coil, and an inverse trapezoidal shape denotes that the horizontal width at the top of a coil is greater than that at the bottom of the coil.

Figure 10:
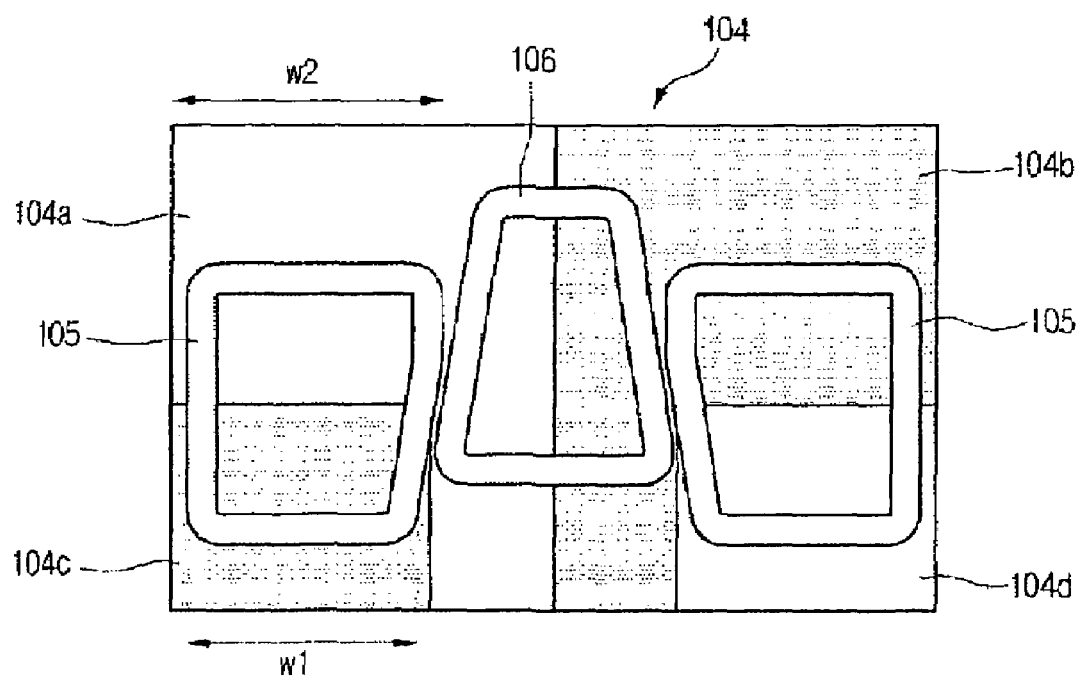
FIG. 10 is a plan view showing the magnets and coils in FIG. 9.

The focusing coil 105 is wound with wire in an asymmetrical, inverse trapezoidal shape, where the coil's lower horizontal width W1 is less than its upper horizontal width W2, as shown in FIG. 10.

Furthermore, by angling the inner side portion of the wound wire of the focusing coil 105 at the same angle as the wound wire at the sides of the tracking coil 106, the proximal wound wire portions of the coils are diagonally disposed.

Figure 9:
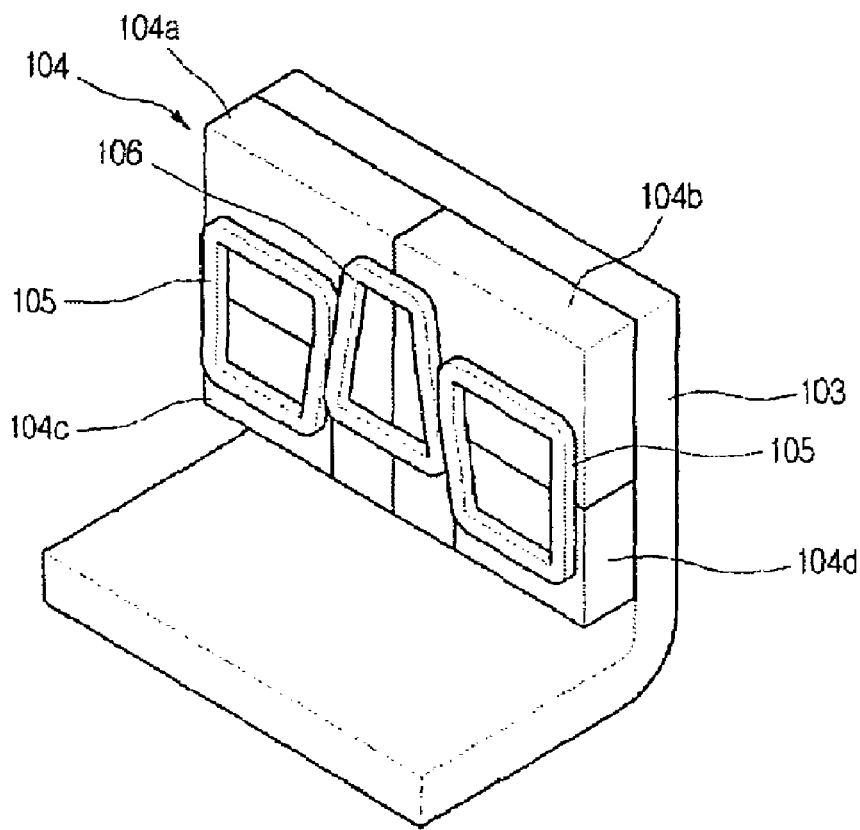
FIG. 9 is a perspective view of the magnetic circuit in FIG. 8.

As shown in FIGS. 9 and 10, the tracking coil 106 faces a boundary of horizontal polarities 104a and 104c of a magnet 104, and the focusing coils 105 face boundaries of vertical polarities (104a and 104c) and (104b and 104d) of the magnet 104. Here, the magnet 104 may be 4 unidirectional magnets, two bipolar magnets, or one quadri-polar magnet.

The upper width W2 of the focusing coil 105 may be expanded due to the trapezoidal tracking coil 106.

Figure 11:
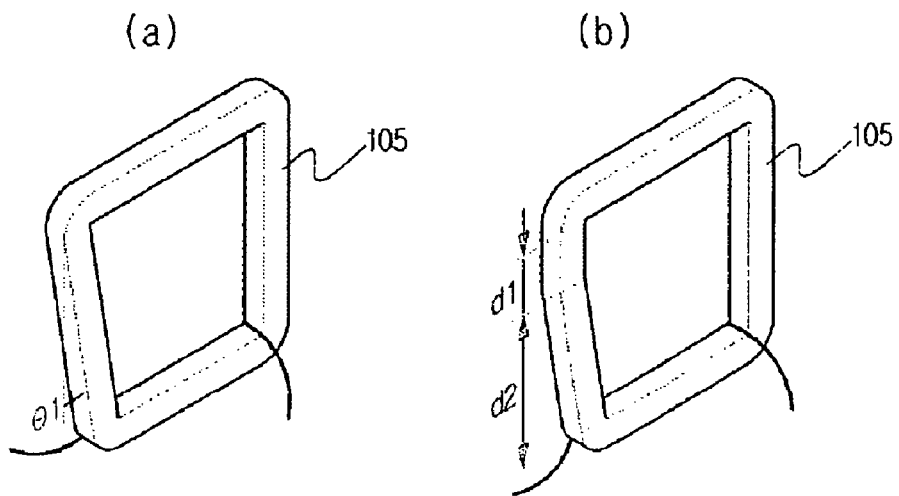
FIGS. 11(a) and 11(b) are perspective views showing respective focusing coils according to the present invention.

Also, the focusing coil 105 may be formed with either its inner upper portion of wound wire adjacent to the tracking coil 106 with an additional bend over a quadrilateral shape or simply in an inverse trapezoidal shape, in order for the wound wire portion of the adjacent coil to be angled. That is, one side of wound wire of the focusing coil 105 shown in FIG. 11a may be angled at a predetermined angle θ1 with respect to a vertical line, or the upper portion d1 of one side of wound wire of the focusing coil 105 shown in FIG. 11b may be vertical while the portion d2 therebelow may be angled. Here, the inverse trapezoidal structure shown in FIG. 11a has advantageous characteristics when considering damage caused by resistance, and the variation thereof shown in FIG. 11b is advantageous from a working perspective.

Because the above focusing coil 105 is wound with wire in an inverse trapezoidal shape and the tracking coil 106 is wound with wire in a trapezoidal shape, the location of the focusing coil 105 need not be dislodged outward. Furthermore, the sum of the lower and upper horizontal widths (w1+w2) is not reduced compared to the related art.

That is, due to the trapezoidal tracking coil 106, the upper horizontal width w2 of the focusing coil can be increased in the comparatively wide space created.

Conversely, the lower horizontal width w1 of the focusing coil 105, disposed in the space reduced by the tracking coil 106 angled to be wider at its base, is reduced to form an inverse trapezoid. In a thus-formed focusing coil 105, there is no reduction in focusing sensitivity.

Also, the tilt coil is wound around the perimeter of the lens holder 101, such that the lens holder 101 may be moved on three axes.

The lens holder 101 has at least two or three pairs of wire suspensions 109 installed, which support the lens holder 101 and also act as paths for supplying current to each coil according to the design of the device.

SECOND EMBODIMENT

FIGS. 12 through 16 are diagrams showing an optical pick-up actuator according to the second embodiment of the present invention.

Figure 12:
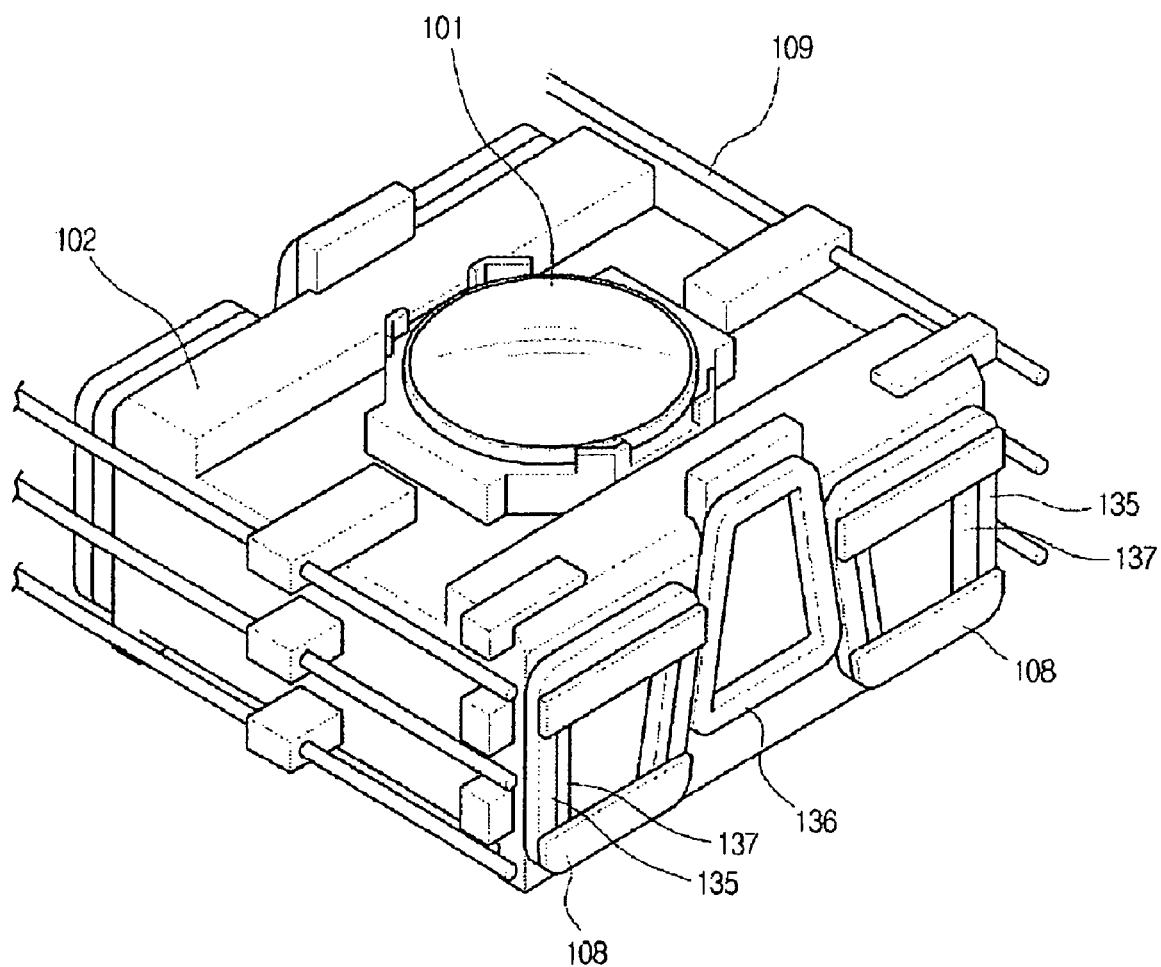
FIG. 12 is a perspective view of an optical pick-up actuator according to the second embodiment of the present invention.

FIG. 12 is a perspective view of an optical pick-up actuator according to the second embodiment of the present invention.

Referring to FIG. 12, an optical pick-up actuator includes a tracking coil 136 wound with wire at a central portion on both sides of a lens holder 101, a focusing coil 135 wound with wire on the left and right on both sides of the lens holder 101, and a tilt coil 137 wound with wire around the perimeter of the focusing coil 135. Each coil 135, 136, and 137 faces a multi-polar magnet.

Here, the focusing coil 135 is installed on the outside in an inverse trapezoidal shape, and the tilt coil 137 is also an inverse trapezoid that is installed to overlap at an inside of the focusing coil 135. In another example, the focusing coil 135 and the tilt coil 137 are inverse trapezoids, and the former is installed at an inside to overlap the latter.

A description of the second embodiment of the present invention will now be given.

Figure 13:
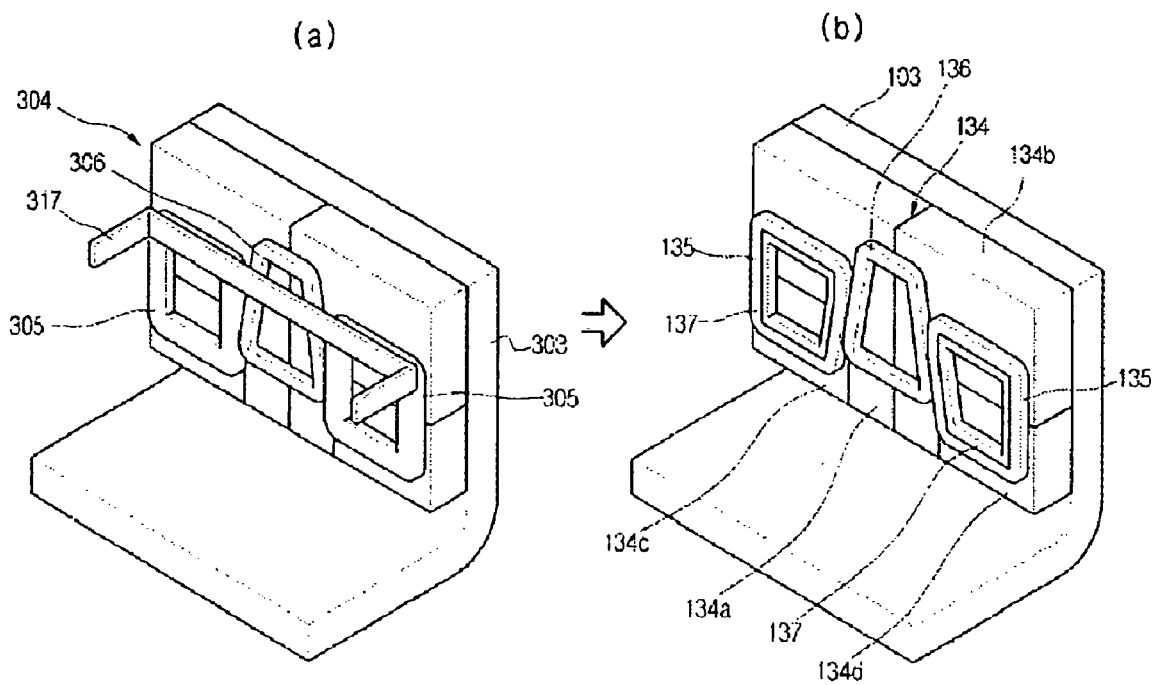
FIG. 13(a) is a perspective view of a magnetic circuit of a 3-axis actuator according to the related art.
FIG. 13(b) is a magnetic circuit according to the second embodiment of the present invention.

First, with reference to FIGS. 12 and 13, a tracking coil 136 is wound with wire at each side of the lens holder 101, and a focusing coil 135 and a tilt coil 137 are wound with wire at the left and right on each side of the lens holder 101. That is, the inverse trapezoidal focusing coil 135 and the inverse trapezoidal tilt coil 107 are sequentially overlapped and wound with wire.

Here, the present invention alters a magnetic circuit from that of the structure of coils 305, 306, and 317 in FIG. 13(a) to the structure of coils 135, 136, and 137 in FIG. 13(b).

Specifically, the tilt coils 137 are respectively wound with wire in the inner surface of the focusing coils 135, and the focusing coils 135 and the tilt coils 137 at the left and right on both sides of the lens holder 101 are sequentially overlapped and wound with wire. Here, the tilt coil 137 is first wound with wire, and then the focusing coil 135 is wound with wire and formed around the outer perimeter of the tilt coil 137. Thus, the tilt coil 137 and the focusing coil 135 are all inverse trapezoids wound with wire.

Figure 14:
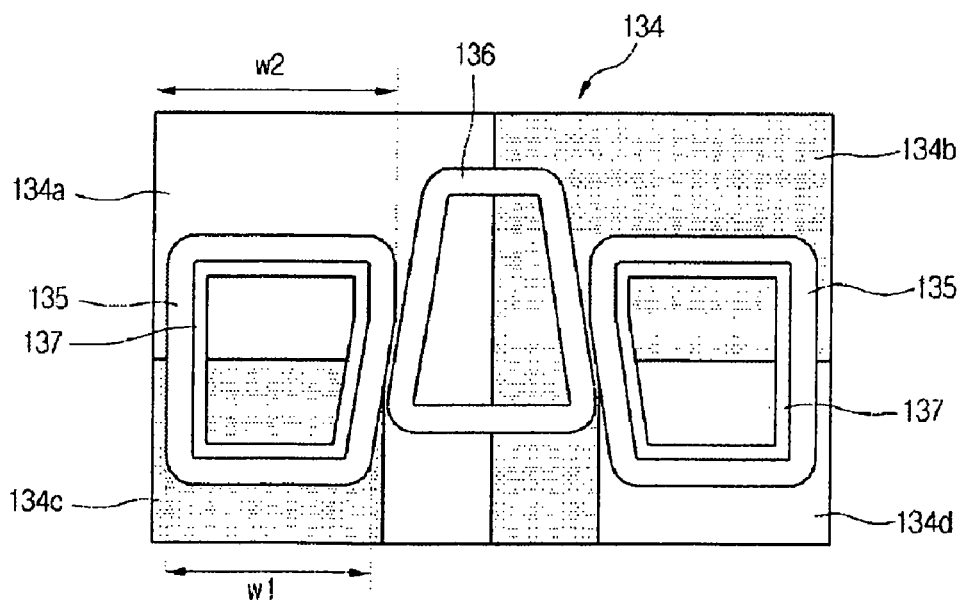
FIG. 14 is a plan view showing a coil and magnet structure according to the second embodiment of the present invention.
Figure 15:
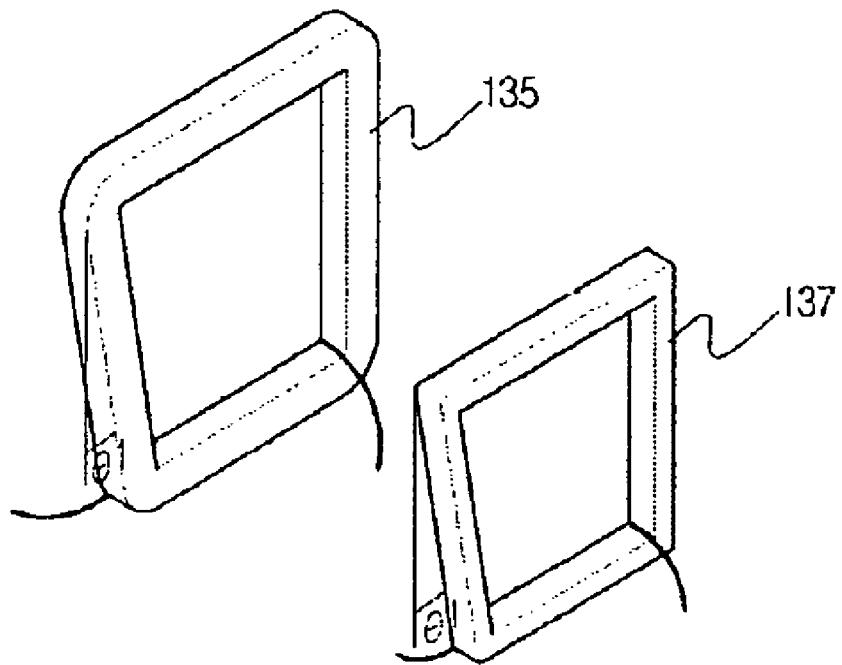
FIG. 15 is a perspective view showing a focusing coil and a tilt coil according to the second embodiment of the present invention.

Referring to FIG. 14, the magnet 134 is composed of multi-polar magnets 134a, 134b, 134c, and 134d, with a current of a predetermined direction and size applied to each coil 135, 136, and 137. Each coil (that is, the focusing coil 135, the tracking coil 136, the tilt coil 137) interacts with the magnets 134a, 134b, 134c, and 134d, so that the lens holder 101 moves on three axes, in focusing, tracking, and radial tilting directions.

Figure 16:
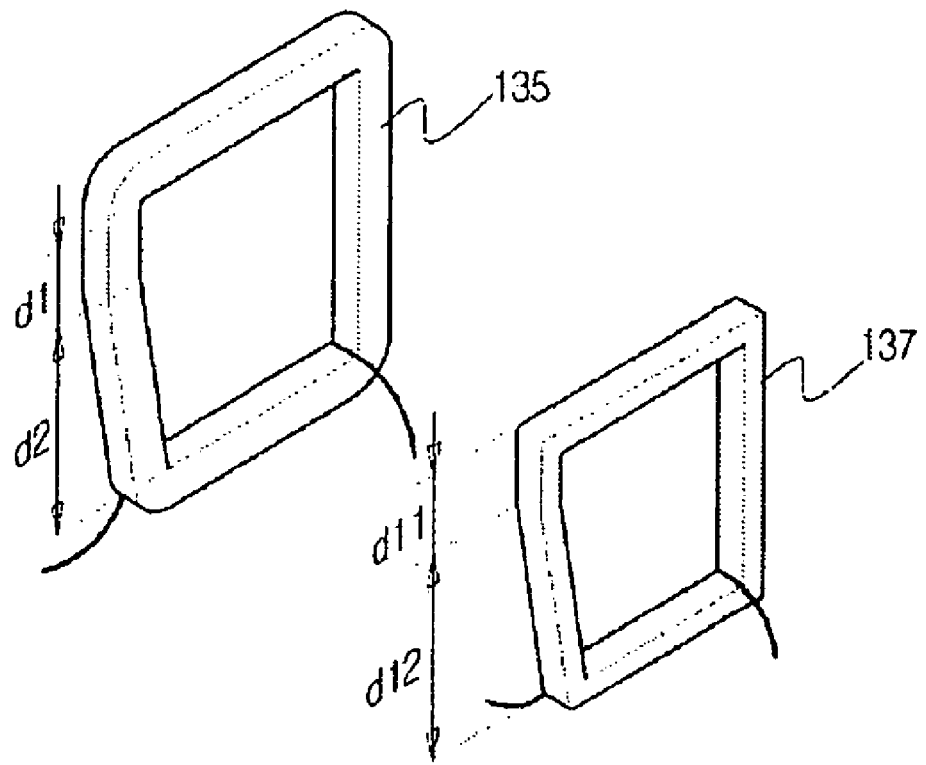
FIG. 16 is a perspective view showing alternative forms of a focusing coil and a tilt coil according to the second embodiment of the present invention.

Here, the portions of the inverse trapezoidal focusing and tilting coils 135 and 137 proximal to the tracking coils 136 are angled at a predetermined angle θ1 or are altered in shape as shown in FIG. 16 so that the upper portions d1 and d11 of the wire windings are vertical and the portions therebelow d2 and d12 are angled to adopt a diagonal line, in order to form an inverse trapezoid.

THIRD EMBODIMENT

Figure 17:
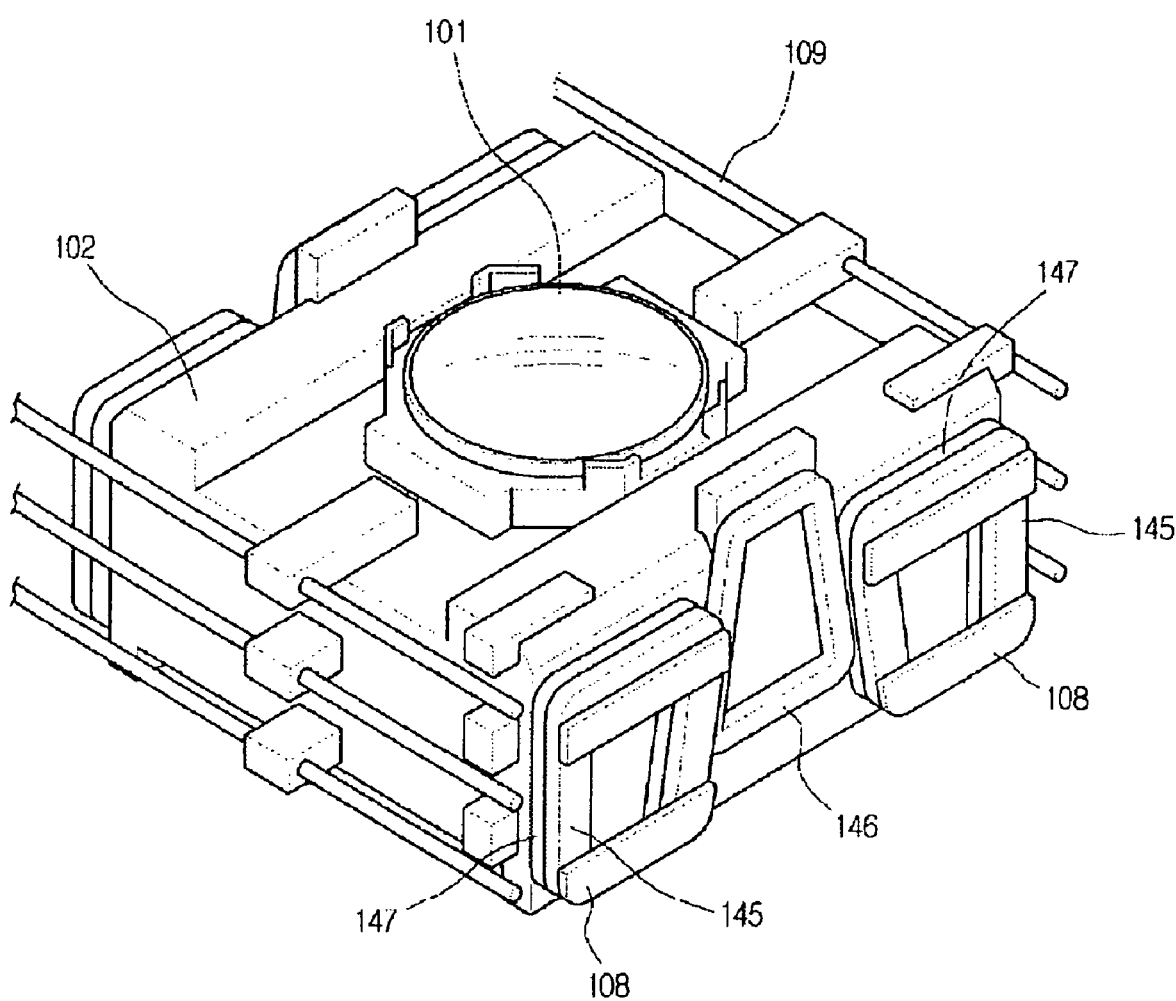
FIG. 17 is a perspective view of an optical pick-up actuator according to the third embodiment of the present invention.
Figure 18:
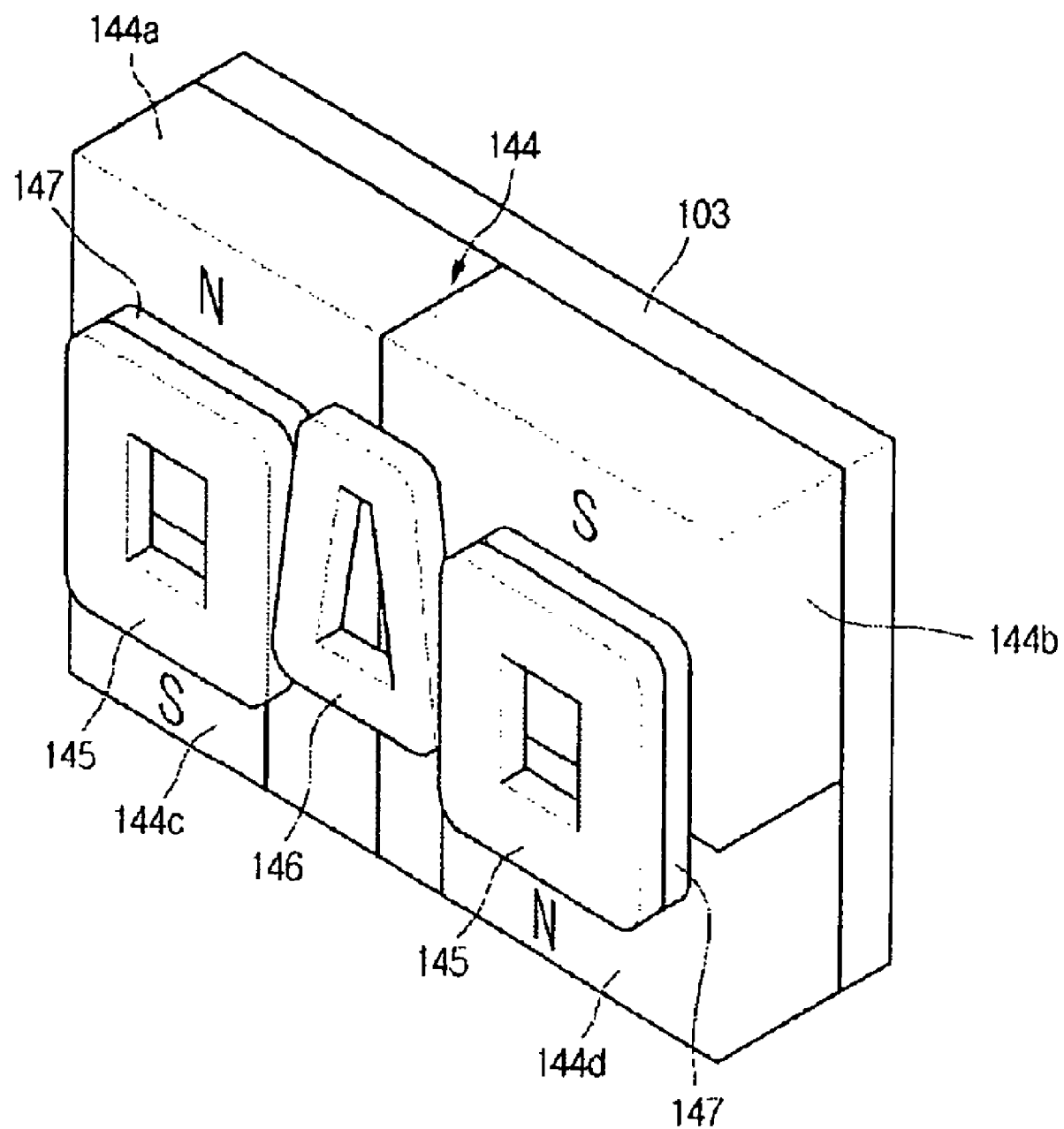
FIG. 18 is a perspective view showing a magnetic circuit according to the third embodiment of the present invention.

FIGS. 17 and 18 are examples of the third embodiment according to the present invention, which will be described below.

FIG. 17 is a perspective view of an optical pick-up actuator for moving on 3 axes, according to the third embodiment of the present invention.

Referring to FIG. 17, a tracking coil 146 is wound with wire at the central portion on both sides of the lens holder 101, and a focusing coil 145 and a tilt coil 147 (that is wound with wire within the inner surface of the focusing coil 145) are disposed to the left and right on both sides of the lens holder 101. Each coil 145, 146, and 147 faces a multi-polarized magnet 144.

Here, the focusing coil 145 is an inverse trapezoid installed on an outer surface of the actuator, and the tilt coil 147 is an inverse trapezoid installed to the inside of the focusing coil 145, so that the two coils 145 and 147 are a double wound wire formed front-to-back. In an altered example, the tilt coil 147 is an inverse trapezoid installed on an outer surface of the actuator, and the focusing coil 145 is an inverse trapezoid installed to the inside of the tilt coil 147.

A description of the third embodiment according to the present invention will now be given.

Referring to FIGS. 17 and 18, a tracking coil 146 is wound with wire at a central portion on each side of a lens holder 102, and inverse trapezoidal focusing coils 145 and tilt coils 147 are wound with wire at left and right portions on both sides of the lens holder 102. The inverse trapezoidal focusing coil 145 and the inverse trapezoidal tilt coil 147 are formed front-to-back in a double wire-wound structure.

Each inverse trapezoidal tilt coil 147 is wound with wire to the inside of a respective focusing coil 145, and the focusing coils 145 and the tilt coils 147 are respectively coupled as a double wound wire at the left and right on both sides of the lens holder 102. Here, the tilt coil 147 and the focusing coil 145 may be wound with wire simultaneously or formed by separately windings of wire.

Referring to FIG. 18, the magnet 144 is formed of magnets 144a, 144b, 144c, and 144d having multi-polarizations and attached to the front of a yoke 103.

A current of a predetermined direction and size is applied to each coil 145, 146, and 147, and the interaction between each coil (the focusing coil 145, the tracking coil 146, and the tilt coil 147) and the magnet 144 allows movement of the lens holder 102 on three axes in focusing, tracking, and radial tilt directions.

Here, the inner portions of wound wire of the inverse trapezoidal focusing coil 145 and tilt coil 147, that is, the portion proximal to the tracking coil 146, may be formed in an inverse trapezoidal shape or the deviation thereof described above.

As describe above, in a drive system for reproducing and recording a high density disk, to eliminate phase disturbance caused by a rolling mode of the actuator, when altering the shape of a tracking coil, the optical pick-up actuator according to the present invention may install a focusing coil corresponding to the tracking coil, in order to prevent a reduction in focusing sensitivity and alignment, while being unaffected by structural restrictions.

Additionally, by being wound with wire simultaneously with the focusing coil, the tilt coil does not require a separate structure for winding wire, and the process of winding wire on the tilt coil can be simplified.

Furthermore, in an actuator moving on 2 or 3 axes, the functional length of the focusing coil is maximized to not only increase focusing sensitivity, but also alignment.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An optical pick-up actuator comprising:
   a lens holder holding an objective lens;
   a tracking coil wound with wire disposed at a central portion on both sides of the lens holder and including an upper width of the tracking coil at a side where the objective lens is located, the upper width of the tracking coil being less than a lower width of the tracking coil;
   a focusing coil wound with wire disposed at a left and a right on both sides of the lens holder and including an upper width of the focusing coil at a side where the objective lens is located, the upper width of the focusing coil being greater than a lower width of the focusing coil; and
   a magnet facing the tracking coil and the focusing coil,
   wherein the upper width and the lower width of the tracking coil are arranged opposite from each other, and
   wherein the upper width and the lower width of the focusing coil are arranged opposite from each other.

2. The optical pick-up actuator according to claim 1, wherein the focusing coil further includes a coil portion connecting horizontal upper and lower coil portions thereof, the coil portion being offset at an angle from a perpendicular direction.

3. The optical pick-up actuator according to claim 1, wherein sides of the focusing coil and the tracking coil that are mutually proximal are offset at a same angle from a perpendicular direction.

4. An optical pick-up actuator comprising:
   a lens holder holding an objective lens;
   a tracking coil wound with wire disposed at a central portion on both sides of the lens holder and including an upper width of the tracking coil at a side where the objective lens located, the upper width of the tracking coil being less than a lower width of the tracking coil;
   a focusing coil wound with wire disposed at a left and a right on both sides of the lens holder and including an upper width of the focusing coil at a side where the objective lens located, the upper width of the focusing coil being greater than a lower width of the focusing coil;
   a tilt coil wound with wire together with the focusing coil; and
   a magnet facing the tracking coil, the focusing coil, and the tilt coil,
   wherein the upper width and the lower width of the tracking coil are arranged opposite from each other, and
   wherein the upper width and the lower width of the focusing coil are arranged opposite from each other.

5. The optical pick-up actuator according to claim 4, wherein the tilt coil includes a horizontal width at a top thereof that is greater than a horizontal width at a bottom thereof.

6. The optical pick-up actuator according to claim 4, wherein the tilt coil is wound with wire in an inner perimeter of the focusing coil.

7. The optical pick-up actuator according to claim 4, wherein the tilt coil is wound with wire around an outer perimeter of the focusing coil.

8. The optical pick-up actuator according to claim 4, wherein the tilt coil is wound with wire between the focusing coil and the side of the lens holder.

9. The optical pick-up actuator according to claim 4, wherein the focusing coil is wound with wire between the tilt coil and the side of the lens holder.

10. The optical pick-up actuator according to claim 4, wherein the focusing coil and the tilt coil include a side proximal to the tracking coil that is offset by a predetermined angle from a vertical axis thereof.

11. The optical pick-up actuator according to claim 4, wherein the focusing coil and the tilt coil include a side proximal to the tracking coil having a bent predetermined portion.

12. An optical pick-up actuator having a magnetic circuit for moving a lens holder holding an objective lens on multiple axes, wherein the magnetic circuit comprises:
 a tracking coil wound with wire at a central portion on both sides of the lens holder and including an upper width of the tracking coil at a side where the objective lens is located, the upper width of the tracking coil being less than a lower width of the tracking coil;
 a focusing coil wound with wire to a left and a right of the tracking coil and including an upper width of the focusing coil at a side where the objective lens is located, the upper width of the focusing coil being greater than a lower width of the focusing coil; and
 a multi-polar magnet having a bi-polarity opposite to the focusing coil and the tracking coil,
 wherein the upper width and the lower width of the tracking coil are arranged opposite from each other, and
 wherein the upper width and the lower width of the focusing coil are arranged opposite from each other.

13. The optical pick-up actuator according to claim 12, wherein the focusing coil further includes a tilt coil wound with wire together with and at a side of the focusing coil.

14. The optical pick-up actuator according to claim 13, wherein the tilt coil includes a horizontal width at a top thereof that is greater than a horizontal width at a bottom thereof.

15. The optical pick-up actuator according to claim 13, wherein the tilt coil is wound with wire in an inner perimeter of the focusing coil.

16. The optical pick-up actuator according to claim 13, wherein the tilt coil is wound with wire around an outer perimeter of the focusing coil.

17. The optical pick-up actuator according to claim 13, wherein the tilt coil is wound with wire between the focusing coil and the side of the lens holder.

18. The optical pick-up actuator according to claim 13, wherein the focusing coil is wound with wire between the tilt coil and the side of the lens holder.

19. The optical pick-up actuator according to claim 13, wherein the focusing coil and the tilt coil include a side proximal to the tracking coil that is offset by a predetermined angle from a vertical axis thereof.

20. The optical pick-up actuator according to claim 13, wherein the focusing coil and the tilt coil include a side proximal to the tracking coil having a bent predetermined portion.

* * * * *